United States Patent [19]

Brown

[11] Patent Number: 4,665,982

[45] Date of Patent: May 19, 1987

[54] FORMATION FRACTURING TECHNIQUE USING LIQUID PROPPANT CARRIER FOLLOWED BY FOAM

[76] Inventor: Billy R. Brown, P.O. Box 450, Freer, Tex. 78357

[21] Appl. No.: 879,070

[22] Filed: Jun. 26, 1986

[51] Int. Cl.⁴ ...................... E21B 43/267; E21B 47/06
[52] U.S. Cl. ...................................... 166/250; 166/91; 166/177; 166/308
[58] Field of Search ............... 166/250, 280, 308, 309, 166/91, 177

[56] References Cited

U.S. PATENT DOCUMENTS

| | | | |
|---|---|---|---|
| 3,846,310 | 11/1974 | Blackwell et al. | 166/308 X |
| 3,851,709 | 12/1974 | Fitch et al. | 166/308 |
| 3,980,136 | 9/1976 | Plummer et al. | 166/308 X |
| 4,033,415 | 7/1977 | Holtmyer et al. | 166/308 |
| 4,156,464 | 5/1979 | Hussin | 166/308 |
| 4,186,802 | 2/1980 | Perlman | 166/308 X |
| 4,237,975 | 12/1980 | Scherubel | 166/308 X |
| 4,378,845 | 4/1983 | Medlin et al. | 166/280 X |
| 4,442,897 | 4/1984 | Crowell | 166/308 X |
| 4,453,596 | 6/1984 | Conway et al. | 166/308 X |
| 4,585,065 | 4/1986 | Penny et al. | 166/308 |

FOREIGN PATENT DOCUMENTS 1161358 1/1984 Canada .................. 166/308

Primary Examiner—George A. Suchfield
Attorney, Agent, or Firm—G. Turner Moller

[57] ABSTRACT

A hydraulic fracturing process includes the step of pumping into the well a fracturing liquid containing a proppant for fracturing the formation and delivering the proppant into the fracture. At or near the end of the fracturing operation, a foam slug is pumped into the well. The pressure in the fracture is reduced and the fracture is closed on the proppant by backflowing the foam slug from the well to the surface.

10 Claims, 6 Drawing Figures

FORMATION FRACTURING TECHNIQUE USING LIQUID PROPPANT CARRIER FOLLOWED BY FOAM

This invention relates to the fracturing of a subterranean formation penetrated by a well bore. More specifically, this invention relates to hydraulically fracturing a formation with a proppant laden liquid followed by a foam which is quickly backflowed to allow the fracture to close on the proppant.

Various methods have been developed and used for increasing the production rate of oil, gas and other fluids from an underground formation penetrated by a well bore. In treating such formations, particularly those which are relatively impermeable and fracturable, it has become common practice to induce fractures in the most productive zones of the formation. The fractures are then propagated laterally outward from the well bore to facilitate the flow of desired fluids from the formation into the well bore.

Fractures in very shallow formations tend to be horizontal whereas fractures at depth are usually vertical. It is presently believed that almost all induced fractures are vertical. Such fractures are started by pumping a fluid known in the art as a "fracturing fluid" through the well bore into the formation. The fracturing fluids presently employed are either gelled liquids or foams. The gelled liquids may be either gelled water or gelled hydrocarbon liquids, such as lease crude, condensate or diesel. The fracturing fluid exerts hydraulic pressure on the formation at the well bore in the most productive and desirable portion of the formation, as controlled by perforations through the well casing and cement sheath. The hydraulic pressure is sufficient to cause the formation to break or fracture. These fissures or fractures are then extended laterally away from the well by continued pumping of the fracturing fluid at high pressure and high volume into the formation.

Some technique has to be used to keep the fractures open after the cessation of pumping. If no proppant were used or no means employed to widen the fractures, bleeding off of the fracturing fluid would merely allow the fracture to close or heal in such a way that there would be little or no substantial long range improvement in apparent permeability.

The most common technique for producing a permanent fracture is to hold the fracture open with a proppant incorporated in the fracturing fluid. Typical proppants include sand, sintered bauxite, glass beads or the like. The idea is that the proppant is transported throughout the extent of the fracture by the fracturing fluid. After pumping ceases, the fracturing fluid changes its proppant carrying capacity, i.e. the gels break or the foams collapse. Some of the liquid is supposed to bleed off into the formation thereby reducing the pressure in the vicinity of the fracture which allows it to close on the proppant which holds the walls of the fracture apart. Therein lies the problem addressed by this invention because fractures often fail to close on the proppant because there is insufficient liquid bleed off into the formation and the pressure in the fracture accordingly remains too high thereby keeping the fracture open.

The major side effect of this is believed to be that the proppant falls out of the gelled fracturing liquid as the gel begins to break thereby accumulating in the bottom of the fracture rather than being dispersed throughout the vertical extent of the fracture. When the fracture ultimately closes, the only area of enhanced permeability is at the bottom of the induced fracture because the top has more-or-less substantially healed.

It is difficult to see why this would occur in formations which have any substantial amount of matrix permeability because it would seem that a good bit of the fracturing fluid would leak off into the formation without much difficulty. On the other hand, the explanation is easy in formations with substantially no matrix permeability where the oil or gas is contained in naturally occurring fractures in the formation. Such formations include the Austin Chalk of South Texas, the Niberra of Colorado and the Devonian shales of West Virginia, Ohio and Kentucky. If there is no matrix permeability, where is the fracturing fluid going to bleed off to and how is it going to get there? It is believed that the proppant begins settling out of the fracturing liquid more quickly than expected and more rapid closing of the fracture is necessary to captivate the proppant in the top of the fracture.

Of some interest with respect to this invention are the disclosures in the U.S. Pat. Nos. 2,859,819; 3,980,136; 4,143,715; 4,156,464; 4,436,156; 4,453,596; and 4,478,282.

This invention broadly comprises a technique which allows the fracture to close on the proppant by reducing the pressure in the fracture. More specifically, the formation is fractured in a conventional manner by pumping into the well a proppant laden fracturing liquid, such as gelled water, gelled lease crude, gelled condensate, gelled diesel or the like. After a predetermined quantity of fracturing liquid and proppant is pumped into the well, it is followed by a quantity of foam. After a small quantity of foam has been pumped into the well, the well is immediately allowed to backflow by an amount about equal to the quantity of foam pumped into the well. This reduces the pressure in the fracture and allows the fracture to close on the proppant. The well is then shut in long enough to allow the gel to break. Then, the well is opened up to clean up and allow the liquid from the broken gel to flow to the surface. When the well cleans up enough to be put on production, the well is shut in, surface facilities are finished and the well then put on production.

It is accordingly an object of this invention to provide an improved hydraulic fracturing technique.

Another object of this invention is to provide an improved fracturing process which is tailored to allow the fracture to close on the proppant.

Other objects and advantages of this invention will become more fully apparent as this description proceeds, reference being made to the accompanying drawing and appended claims.

IN THE DRAWINGS

Figure 1:
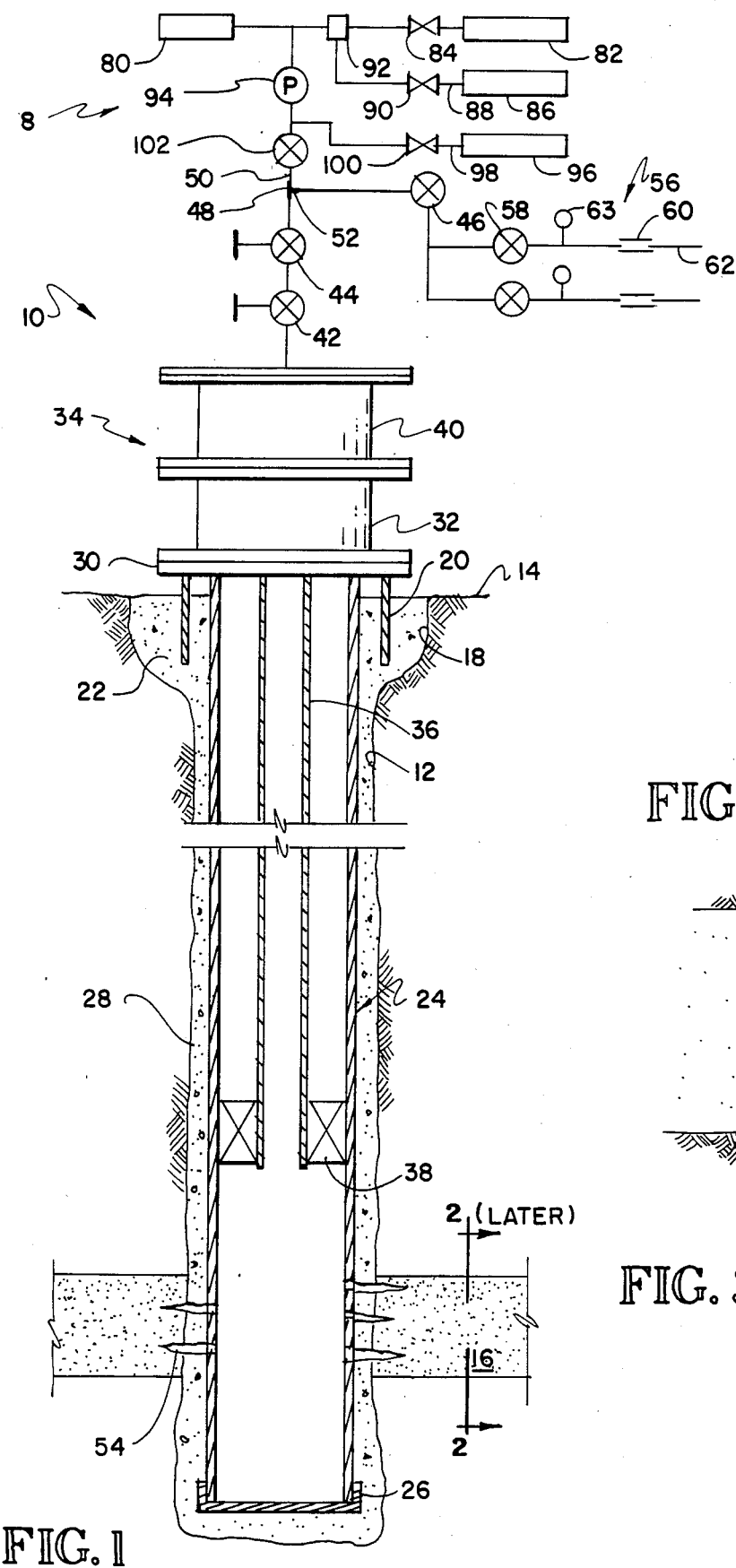
FIG. 1 is a partially schematic vertical cross-sectional view of a well extending into the earth to a location adjacent a productive formation at a time during fracturing thereof.

Referring to FIG. 1, there is illustrated a well 10 in the process of being hydraulically fractured. The well 10 includes a bore hole 12 extending from the surface 14 into the earth sufficient to penetrate a hydrocarbon bearing formation 16. Typically, the upper or surface hole 18 is of larger diameter than the balance of the bore hole 12 having a string 20 of surface pipe cemented therein by a cement sheath 22. The well bore 12 below the surface pipe 20 is obviously drilled with a bit of smaller diameter than the surface pipe 20. A casing string 24 has been cemented in a conventional manner in the bore hole 12 the use of a float shoe arrangement 26, float collar (not shown) and cementing plugs (not shown). Thus, a cement sheath 28 surrounds the casing string 24 for a substantial vertical extent above the formation 16 and typically, but not universally, extends to the surface 14.

A bradenhead 30 is usually attached to the uppermost joint of the surface pipe 20 and receives slips (not shown) suspending the casing string 24 from the surface. Attached to the top of the bradenhead 30 and sealed around the exterior of the casing string 24 is a casing head 32 of any suitable type, comprising part of a Christmas tree 34.

The well 10 can be fractured down the casing string 24 merely by pumping the fracturing fluid into the casing string before a tubing string is run into the well 10. In the alternative, and as illustrated in FIG. 1, the well 10 may be fractured by pumping down a tubing string 36 connected to a packer 38 seated against the interior surface of the casing string 24 somewhat above the hydrocarbon bearing formation 16.

Thus, the tubing string 36 is suspended in a tubing head 40, comprising part of the Christmas tree 34, having means (not shown) sealing about the exterior of the tubing string 36. On top of the tubing head 40 are a series of schematically illustrated lower and upper master valves 42, 44 and a wing valve 46 used to control the flow of fluids from the formation 16 during production of the well 10. A tee 48 is usually threaded into the top of the upper master valve 48 and provides an upwardly facing threaded end 50 which normally received a tapped bull plug and a gauge (not shown) and a laterally facing threaded end 52 connected to the wing valve 46. Typically, but not universally, hydraulic fracturing operations are conducted through the upwardly facing threaded end 50 of the tee 48 as by running a tree saver (not shown) or the like through the Christmas tree 34 and attaching pumping connections (not shown) from conventional pump trucks to the threaded end 50 of the tee 48.

There are a variety of techniques by which the well 10 can be prepared to be fractured. Manifestly, the casing string 24 must be perforated prior to fracturing. This is often done before the tubing string 24 is in place by running a casing gun (not shown) into the well 10 on a wire line and firing the gun to create a series of vertically spaced perforations 54 which extend from the inside of the casing string 24, through the casing string 24 and cement sheath 28 into the formation 16. In the alternative, perforating is often conducted after the tubing string 24, packer 38 and tree 34 are assembled and in place by lowering a tubing gun (not shown) through a lubricator (not show) attached to the threaded end 50 of the tee 48 and detonating the perforating charges at the desired locations.

Usually, the well 10 is placed on production after it is perforated to determine if fracturing is needed. Even in areas where most wells are fractured, some will come in flowing and obviously do not require stimulation. Thus, most wells have been produced or have been attempted to be produced and accordingly having tubing in the hole. It is thus usually more desirable to fracture the well down the tubing because the operator will not need a rig to remove the tubing from the well.

In the process of this invention, it is much preferred to frac down the tubing because a substantial amount of the injected fluids will be backflowed from the formation to the surface. It is much more desirable to conduct such backflow through the tubing because tubing, being of smaller I.D., is capable of withstanding much higher pressures than casing.

Thus, it is preferred to pump the fracturing liquid down the well through the threaded end 50 of the tee 48 and allow backflowing through the wing valve 46 and choke manifold or control head 56 comprising a pair of parallel valves 58 and chokes 60 of different size leading to one or more flare lines 62 extending away from the well 10.

The fracturing liquid used in the process of this invention is subject to wide variation. Water, diesel, lease crude or condensate which is gelled with conventional gelling agents is quite satisfactory. Similarly, the proppant used in the process of this invention may vary widely. Sand is the most widely used proppant because it is inexpensive and readily available. Sintered bauxite, glass beads and the like are used in deeper environments where sand has proved, or is suspected of being, unsatisfactory.

In general, the fracturing operations of this invention are more-or-less conventional until the frac job is nearly over. Thus, typical frac jobs of this invention start with a low viscosity proppant free pad of the fracturing liquid, followed by a high viscosity, but proppant free, pad of the gelled fracturing liquid. After the gelled pad is pumped in the well, addition of the proppant begins. Usually, the amount of proppant per unit of gelled fracturing liquid starts off at a low value with the amount of proppant increasing as the frac job continues. After a predetermined quantity of gelled fracturing liquid and proppant is pumped into the well, a predetermined quantity of proppant and a foam are pumped into the well, followed by a flush to deliver all of the proppant into the formation. After the flush is pumped into the well, the pumps are shut down and backflowing of some of the pumped materials begins.

Initially, backflowing is conducted through a first choke of relatively small size until the bottom hole flowing pressure drops to a value less than a previously known bottom hole shut in pressure. At this time, the choke manifold or control head is manipulated to deliver the foam through a second choke of somewhat larger size until the bottom hole flowing pressure drops to a value on the order of about 300–500 psi less than the known bottom hole shut in pressure. Then, the well is shut in and allowed to sit for about 24 hours to allow the gelled liquids to break whereby the viscosity of the liquid decreases dramatically. The well is then turned on through a choke and allowed to clean up. When the well has cleaned up, it is turned on through conventional production facilities and produced. Pressures and volumes are preferably monitored for about 90 days to determine the initial success of the frac job and the longevity of the treatment.

One of the uncertainties in the process of this invention is knowing when to shut the well in while backflowing foam from the well 10. It is preferred that the well 10 is shut in when the bottom hole flowing pressure has dropped enough to allow the fracture to close. The exact maximum pressure that any particular fracture will close is not known and perhaps is not knowable.

In the practice of this invention, it is preferred to backflow foam from the well 10 until the bottom hole flowing pressure is less than the known value of the bottom hole shut in pressure before the well was fraced. It is well known to those skilled in the art that the bottom hole flowing pressure of a well is the surface flowing pressure plus the hydrostatic head of the fluid in the well bore. The surface pressure is easily determined by a gauge 63 upstream of the chokes 60. An exact value for the hydrostatic head of the foam being produced through the well 10 is difficult to obtain. An approximate value can be readily estimated by multiplying the depth of the well by an assumed value for the pressure gradient of the foam. The pressure gradient for salt water is 0.433 psi/foot. Thus, the pressure gradient of foamed liquids will be substantially less, depending on the density of the liquid and the amount of gas injected therein. The bottom hole shut in pressure of the formation 16 can be determined in a variety of ways. Simplest, a test of some description will have been run on the formation 16 before pipe was cemented in the well. In such tests, a bottom hole shut in pressure is almost always included. The most reliable bottom hole pressure, however, is taken by running a bottom hole pressure bomb in the well 10 after it is completed and cleaned up.

Figure 2:
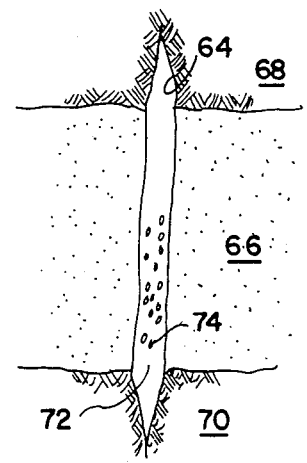
FIG. 2 is a vertical cross-section of a well in the process of being hydraulically fractured in a conventional manner.
Figure 3:
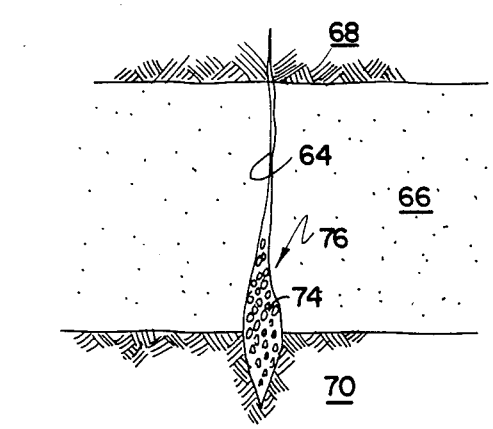
FIG. 3 is a vertical cross-section of a well hydraulically fractured in a conventional manner in which proppant has fallen out of the fracturing fluid before the fracture has closed.

The problem addressed by this invention is best shown in FIG. 2 where a vertically extending fracture 64 has been propagated through a tight hydrocarbon bearing formation 66 located between a pair of shale beds 68, 70. The fracture 64 contains therein a gelled fracturing liquid 72 and a large quantity of proppant 74. In a conventional frac job, the well is shut in to allow some of the liquid 72 to bleed off into the formation 66 thereby lowering the pressure in the fracture 66 so it will close and trap the proppant 74. What often happens is illustrated in FIG. 3 where a great deal of the proppant 74 has dropped out of the fracturing liquid into the bottom of the fracture 64 thereby allowing the upper part of the fracture to substantially heal without being propped open. Thus, the only area of dramatically improved permeability is a zone 76 adjacent the lower part of the formation 66, some or conceivably all of which lies in the underlying shale formation 70. Those skilled in the art will appreciate by now that it would be desirable to prop open the fracture 64 throughout its height and not just at the bottom thereof, as shown in FIG. 3.

In this invention, the fracture is caused to close on the proppant by tailing in with a foam laden proppant and backflowing some or all of the foam until the observed flowing surface pressure indicates that the fracture has closed.

Referring back to FIG. 1, the frac equipment 78 includes a sand or proppant delivery system 80, a source 82 of ungelled liquid including a shut off valve 84, a source 86 of chemical for gelling the liquid including a conduit 88 having a shut off valve 90 therein, a mixer 92 for mixing the gelling chemical with the ungelled liquid, one or more pumps 94 for delivering liquid or slurry to the well 10 and a high pressure gas or nitrogen facility 96 for delivering high pressure gas through a line 98 having a shut off valve 100 therein. A crown valve 102 is preferably mounted on top of the well 10. The sand delivery system 80 includes means (not shown) for starting and stopping the system 80 for either delivering proppant through the equipment 78 or not delivering proppant. It thus appears that the equipment 78 is capable of delivering to the well 10 gelled or ungelled liquid with or without proppant and either foamed or not foamed.

The following example is representative of a frac job in accordance with this invention:

Well information:
  TD 6350'
  5½" O.D. 17#/ft casing set to 6350'
  perfs: 6200-12' with 2 shots/ft—24 shots
  perforations: nominal 0.25" diameter
  Baker Model R double grip packer at 6000'
  2⅞" O.D. 6.5#/ft tubing landed in packer
Fluids: Halliburton gelled oil (My-T-Oil) followed by gelled oil foamed with 2000 scf/bbl nitrogen
Proppant: Ottawa 20-40 sand

| PROCEDURE | | |
|---|---|---|
| | Gallons | Sand, # |
| (1) Start low viscosity pad | 10,000 | 0 |
| (2) Start high viscosity pad | 10,000 | 0 |
| (3) Begin sand at 2#/gal in gelled oil | 3,000 | 6,000 |
| (4) Begin sand at 4#/gal in gelled oil | 3,000 | 12,000 |
| (5) Begin sand at 6#/gal in gelled oil | 6,000 | 36,000 |
| (6) Begin sand at 8#/gal in gelled oil | 10,000 | 80,000 |
| (7) Continue sand at 8#/gal in foam | 6,000 | 48,000 |
| (8) Begin flush with clean gel | 1,000 | 0 |
| (9) Begin flush with low viscosity oil | 654 | 0 |
| | 49,654 | 182,000 |

Place crown valve 102 on top of well head. Have 6/64" and 8/64" chokes in manifold 56. Step 1—Pump in pad at high volume while increasing pressure to above fracturing pressure. Step 2— Begin adding gelling agent through valve 90. Step 3—Begin adding sand through delivery system 80 at 2#/gallon of gelled fracturing liquid. Steps 4-6—Increase sand content. Step 7—Open valve 100 and begin adding nitrogen to sand-gelled oil mixture. Step 8—Close valve 100 to stop foam production and halt delivery of sand from system 80. Step 9—close valve 90 and convert from gelled to ungelled oil.

Immediately after flush is in place, shut down pump 94 and close valve 102. Open wing valve 46 and lower control valve 58 and start flow back on 6/64" choke. When surface flowing pressure on gauge 63 drops to bottom hole shut in pressure less hydrostatic head, change to 8/64" choke and flow for 2-3 minutes or until flowing well head pressure drops to 300-500 psi, whichever occurs first.

Shut well 10 in and wait for 1-2 days for the gel to break. After shut in time has elapsed, flow well back with 8/64" choke. After getting bottoms up two or three times, change to 10/64" choke to clean up.

When well 10 cleans up, turn to production and monitor results. Document production for 90 days.

Figure 4:
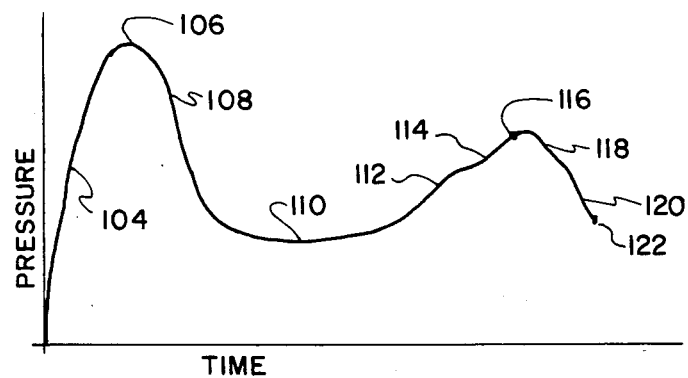
FIG. 4 is a graph showing the pressure-time relationship at the surface during a hydraulic frac operation in accordance with this invention.

The pressure necessary to initiate the fracture is known as the fracturing pressure and depends on the depth of the formation 16 and the area where the well is located. In general, vertical fractures in relatively deep wells will start when the applied bottom hole pressure is in the range of 0.8 psi/foot. FIG. 4 is a graph showing the relationship of surface pressure and time during a frac job in accordance with this invention. When pumping begins, pressure rises along a very steep generally linear section 104 until it reaches a maximum 106, which is the fracturing pressure. As the fracture propagates, the pressure falls off along a graph section 108 where sand is being added to the fracturing liquid. The addition of sand lowers the surface pressure shown in FIG. 4 because the bottom hole pressure remains fairly steady and the additional hydrostatic head of the sand acts to lower the surface pressure. The graph section 110 represents step 6 in the above example where the hydrostatic head is the greatest. When nitrogen is added to the mixture, in step 7, the surface pressure rises as shown in section 112. When no more sand is added, as in flush steps 8 and 9, the surface pressure rises along graph section 114 and the well is shut in at point 116. Quite soon after the well is shut in, e.g. a few minutes and certainly less than one hour, the well 10 is back flowed through the smaller choke 60 so the surface pressure falls along line 118. When the well 10 is placed on the larger choke, pressure declines more rapidly along the line 120. The well is shut in at point 122.

Figure 5:
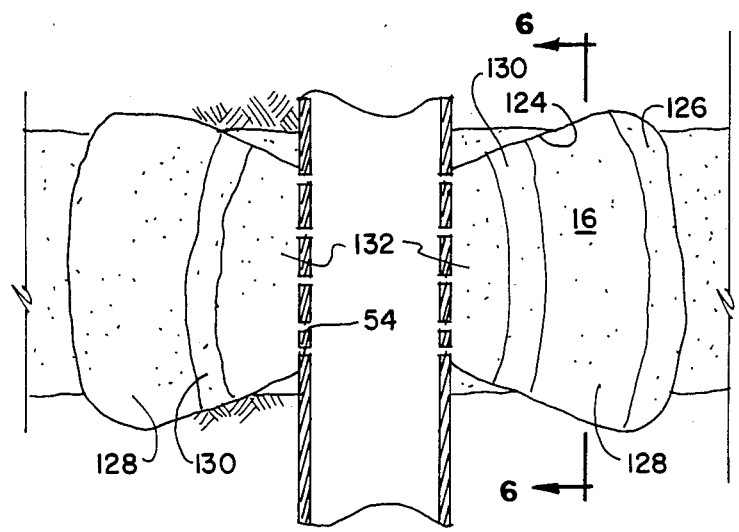
FIG. 5 is a vertical cross-sectional view of the well of FIG. 1 illustrating the condition in the formation near the end of the hydraulic fracturing operation.

FIG. 5 represents an intermediate stage of the fracturing process of this invention where a fracture 124 has been initiated and propagated through the perforations 54 into the formation 16. The fracture 124 is filled with a pad 126 representing both the low viscosity and high viscosity pads mentioned in the example. The sand-gelled liquid mixture 128 fills most of the fracture 124 and is followed by the foam-sand mixture 130 and flush 132.

Figure 6:
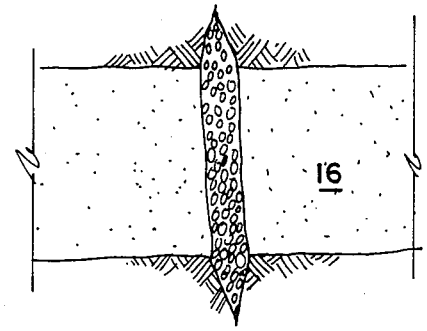
FIG. 6 is a vertical cross-sectional view, taken substantially along line 6—6 of FIG. 5 as viewed in the direction indicated by the arrows, illustrating a time later than that shown in FIG. 5.

When back flowing of the well 10 begins, the flush 132 and a significant part of the sand-foam mixture 130 are flowed through the perforations 54 into and upwardly through the well 10 to the surface. This backflow occurs at a rate which is relatively slow because of the flow restriction afforded by the choke 60. This is in contrast to some prior art approaches where backflowing at the end of a frac cycle is done in an effort to spall material off the face of the fracture. This relatively slow backflow reduces the pressure in the formation 16 as suggested in FIG. 4 by the graph sections 118, 120 which allows the fracture 124 to close rather quickly on the proppant thereby captivating the proppant throughout substantially all of the vertical extent of the fracture 124 as suggested in FIG. 6.

Although the invention has been described in its preferred form with a certain degree of particularity, it is understood that the present disclosure of the preferred forms is only by way of example and that numerous changes in the details of operation may be resorted to without departing from the spirit and scope of the invention as hereinafter claimed.

I claim:

1. A process of hydraulically fracturing a subterranean formation penetrated by a well extending into the earth, comprising
   initiating and propagating a vertical fracture in the formation by pumping into the well a mixture of a proppant and a fracturing liquid selected from the group consisting of gelled water and gelled liquid hydrocarbons at a pressure greater than the fracturing pressure and at a substantial volume; and
   terminating the fracturing process and closing the fracture on the proppant including
      ceasing the pumping of the mixture of proppant and fracturing liquid into the well and commencing the pumping of a predetermined quantity of foam into the well; and then
      backflowing at least a substantial quantity of the foam from the formation; and then
      shutting the well in.

2. The process of claim 1 wherein the formation bottom hole shut in pressure is a predetemined value and the backflowing step comprises backflowing foam from the formation to the surface until the flowing pressure at the surface plus the hydrostatic head of the foam in the well is less than the formation bottom hole shut in pressure.

3. The process of claim 1 wherein the ceasing and commencing steps comprise converting the gelled fracturing liquid into a foam.

4. The process of claim 3 wherein the converting step comprises injecting a high pressure gas into the gelled fracturing liquid.

5. The process of claim 4 wherein the high pressure gas is nitrogen.

6. The process of claim 1 wherein the commencing step comprises commencing the pumping of foam and proppant into the well.

7. The process of claim 6 wherein the formation bottom hole shut in pressure is a predetermined value and the backflowing step comprises backflowing foam from the well to the surface and then through a choke until the flowing pressure at the surface plus the hydrostatic head of the foam in the well is less than the formation bottom hole shut in pressure.

8. The process of claim 6 wherein the backflowing step comprises backflowing a first quantity of foam from the formation to the surface and then through a first choke until the flowing pressure at the surface plus the hydrostatic head of the foam in the well is less than the formation bottom hole shut in pressure and then backflowing a second quantity of foam from the formation to the surface and then through a second choke larger than the first choke.

9. The process of claim 8 wherein the step of backflowing a second quantity of foam comprises backflowing a second quantity of foam from the formation until the bottom hole flowing pressure is 300–500 psi less than the formation bottom hole shut in pressure.

10. The process of claim 1 wherein the formation bottom hole shut in pressure is a predetermined value and the backflowing step comprises backflowing foam from the formation to the surface until the bottom hole flowing pressure is less than the formation bottom hole shut in pressure.

* * * * *